United States Patent
MacDonald et al.

(10) Patent No.: US 6,557,101 B1
(45) Date of Patent: Apr. 29, 2003

(54) METHODS AND APPARATUS FOR UPGRADING PROGRAMMABLE CONTROL LOGIC WITHOUT DISTURBING NETWORK TRAFFIC FLOWING THROUGH FUNCTIONAL ELEMENTS CONTROLLED BY THE CONTROL LOGIC

(75) Inventors: Eric MacDonald, Epping, NH (US); Thomas Kong, Brookline, MA (US); Paolo Forte, Belmont, MA (US)

(73) Assignee: Sycamore Networks, Inc., Chelmsford, MA (US)

( * ) Notice: Subject to any disclaimer, the term of this patent is extended or adjusted under 35 U.S.C. 154(b) by 0 days.

(21) Appl. No.: 09/470,487

(22) Filed: Dec. 22, 1999

(51) Int. Cl.⁷ .............................. G06F 9/00; G06F 13/00
(52) U.S. Cl. ....................................... 713/100; 710/302
(58) Field of Search ........................... 713/100; 710/302, 710/301, 62

(56) References Cited

U.S. PATENT DOCUMENTS 5,247,195 A * 9/1993 Turner et al. ................ 257/203
5,297,067 A * 3/1994 Blackborow et al. ........ 360/137
5,734,841 A * 3/1998 Shin et al. ................... 710/302
6,005,985 A * 12/1999 Brison et al. ................ 382/278

* cited by examiner

*Primary Examiner*—Thomas Lee
*Assistant Examiner*—Suresh Kumar Suryawanshi
(74) *Attorney, Agent, or Firm*—Weingarten, Schurgin, Gagnebin & Lebovici LLP

(57) ABSTRACT

A network device includes latches disposed between control outputs of control logic such as a field-programmable gate array (FPGA) and control inputs of functional elements through which network traffic flows. The control logic generates a latch enable signal that controls the operation of the latches. The latch enable signal is in a latching state to maintain the latches open during normal operation. During an upgrade, the control outputs may take on incorrect or indeterminate values, due to entering a high-impedance state. Therefore, during the upgrade the latches are closed, maintaining the pre-upgrade values on the inputs of the functional elements and preventing the control logic outputs from affecting operation of the device. After re-programming is complete and the control outputs are in a determinate state, the latches are re-opened. A pullup/pulldown circuit is used to maintain the latch enable signal in a latching state during the upgrade.

28 Claims, 3 Drawing Sheets

METHODS AND APPARATUS FOR UPGRADING PROGRAMMABLE CONTROL LOGIC WITHOUT DISTURBING NETWORK TRAFFIC FLOWING THROUGH FUNCTIONAL ELEMENTS CONTROLLED BY THE CONTROL LOGIC

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention is related to the field of control logic for network devices, and in particular to techniques for field upgrading of programmable control logic used in network devices.

There is often a need to upgrade network equipment that has already been deployed in an operational network. This need can stem, for example, from evolving requirements placed upon the equipment over time. However, equipment that has been installed and is in use provides value in the form of either service or revenue to its operator. When an upgrade occurs, the benefits of the network can be lost if the network is not available for user traffic. Thus it is generally desirable to avoid, as much as possible, any disruption in service when performing an upgrade.

There are two major categories of functions performed in networking equipment. One is the processing of user traffic and the movement of traffic from one set of ports to another set of ports. The other is the observation and control of the user traffic for purposes such as network management, i.e., gathering information about network operation, establishing and modifying equipment configurations, responding to events such as equipment failure, etc. Although the boundary between processing/moving functions and observation/control functions in a given system is not always clear, the distinction is a useful one from the perspective of managing a network. In particular, the upgrading of network equipment may require changes to processing/moving functions, to observation/control functions, or to a combination of functions of both types. If an upgrade affects processing/moving functions, it is generally difficult if not impossible to avoid a disruption in service. For the upgrading of observation/control functions, however, it may be more possible, and hence desirable, to avoid a service disruption, if the observation/control functions do not directly affect the movement of data through the equipment.

BRIEF SUMMARY OF THE INVENTION

In accordance with the present invention, a network device is disclosed in which programmable control logic can be upgraded without disturbing network traffic flowing through functional elements controlled by the control logic. The availability of the equipment is improved with only a minor increase in circuit complexity and component count.

The device includes latches or similar storage elements disposed between the control outputs of the control logic and the control inputs of the functional elements. During normal operation, the latches are in an "open" state to pass control signals from the control logic to the functional elements. The control outputs of the control logic may take on incorrect or indeterminate values during an upgrade. Therefore, during an upgrade, the latches are closed to maintain the control values on the inputs of the functional elements and to prevent the outputs of the control logic from affecting operation. After the re-programming is complete, the latches are re-opened so as to allow the outputs of the control logic to thereafter affect the operation of the functional elements.

The control logic can be implemented in a field-programmable gate array (FPGA) or similar logic having the property that at some point during re-programming, the control outputs temporarily take on a high-impedance value. The FPGA may be responsible for generating a latch enable signal that controls the latching of the inputs of the functional elements, in which case the latch enable signal also enters the high-impedance state during re-programming. The latch enable signal is maintained at a "latching" value, i.e. a value that holds the latches closed, by a pullup/pulldown circuit during re-programming. Alternative circuits are shown for overriding an indeterminate latch enable signal generated by the control logic.

The disclosed use of latches on control signals provides a straightforward way to avoid affecting network traffic during necessary system upgrades, improving the quality of service experienced by network users.

Other aspects, features, and advantages of the present invention are disclosed in the detailed description that follows.

DETAILED DESCRIPTION OF THE INVENTION

Figure 1:
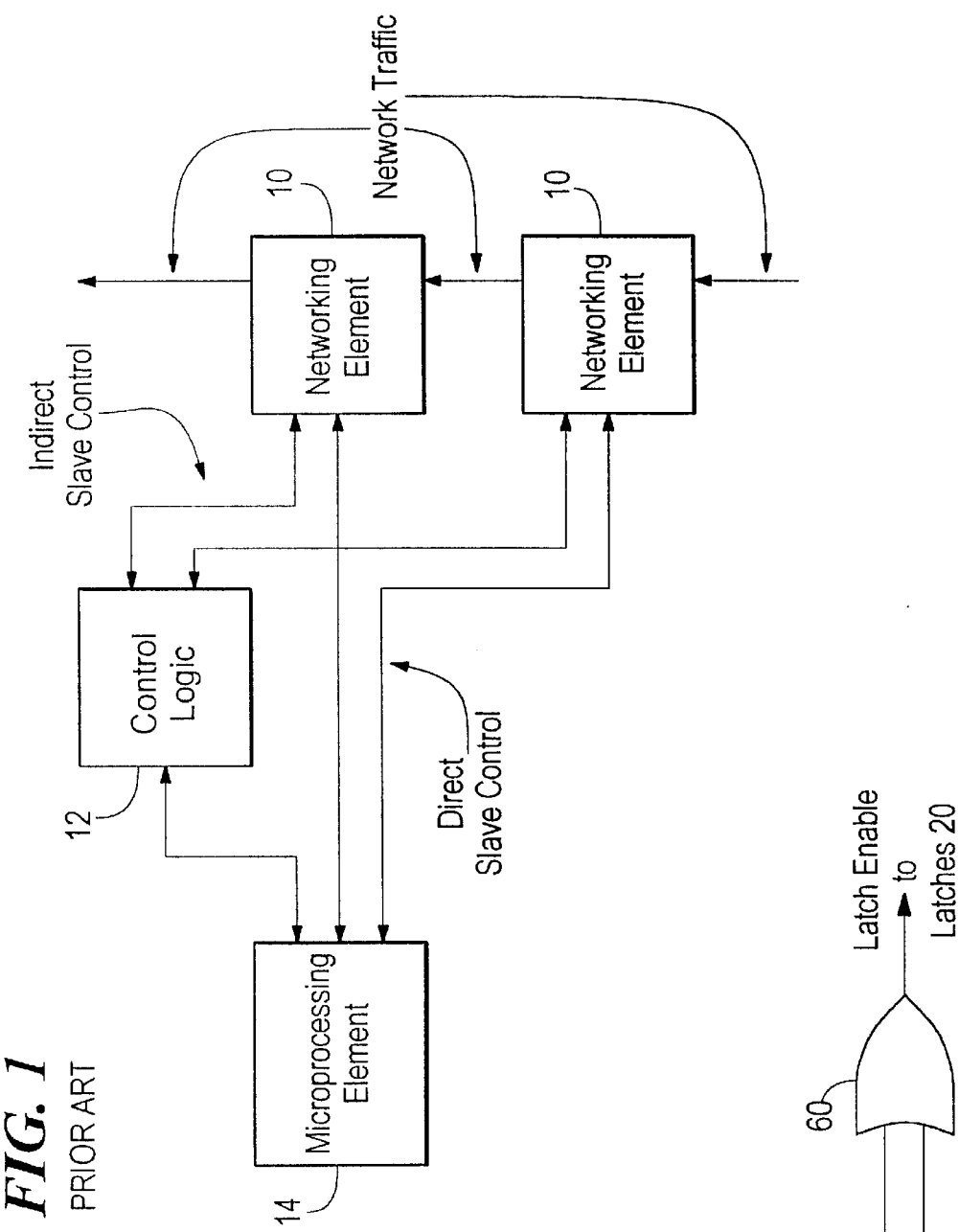
FIG. 1 is a block diagram of a network device having control signals provided to functional elements as is known in the art.

In FIG. 1, a prior art network device has a number of functional elements 10 that are responsible for moving data signals from one port to another. In many cases, the elements 10 require control signals to be provided from external control logic, such as control logic 12. It is also known to provide a microprocessor 14 to perform higher-level monitoring and control functions, in particular functions that may involve interfacing to a yet higher-level processor (not shown) or to other network devices in a system (also not shown). These functions can include, for example, performance monitoring and reporting, executing diagnostics, configuring the control logic 12 and/or the elements 10 for operation, etc.

In many systems there is a fairly clean partition between signal-processing elements, such as the functional elements 10 in FIG. 1, and at least some of the control functionality required for proper operation, which in the illustrated device is contained within the control logic 12 and the microprocessor 14. Such a partitioning enables the device to be readily upgraded, for example by re-programming the control logic 12 or microprocessor 14, without requiring any changes to the functional elements 10. Upgrades are required, for example, as the operational requirements evolve for the network in which the device is used. Ready upgradeability can therefore be of significant value to users of the network device.

In some cases, the control signals provided to the elements 10 by the control logic 12 take on incorrect or indeterminate values during an upgrade. For example, if the control logic 12 is implemented using certain types of field-programmable gate arrays (FPGAs), it is necessary to perform a hard reset of the FPGA when a new logic image is loaded into the FPGA during an upgrade. This hard reset causes the outputs of the FPGA to return to their initial logic state, not the last state programmed by the control processor. The networking elements 10 may respond to these values in a spurious manner, causing a disruption in service. Therefore, upgrades of field-programmable control logic have typically caused some level of service disruption.

Figure 2:
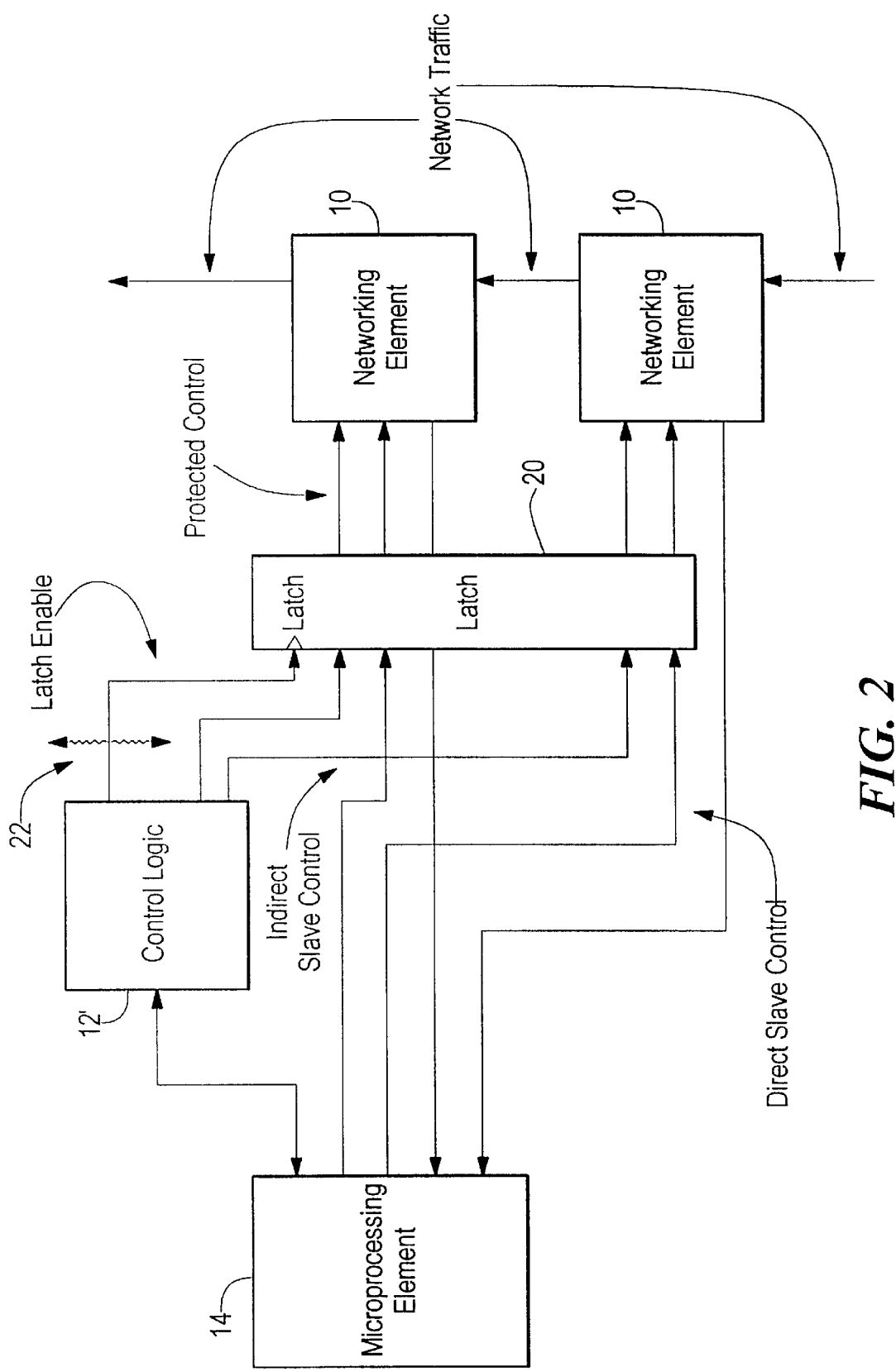
FIG. 2 is a block diagram of a network device having control signals provided to functional elements according to the present invention.

FIG. 2 shows a network device that generally avoids affecting network traffic during certain types of upgrades. The network elements 10 and the microprocessor 14 may be of the same type as in the prior art system of FIG. 1. As described below, the control logic 12' includes certain functionality to enable steady operation of the elements 10 during an upgrade.

The control outputs of the control logic 12' and/or the microprocessor 14 are provided to a set of latches 20. The outputs of the latches, shown as "protected control" in FIG. 2, are provided to the control inputs of the elements 10. The control logic 12' generates a Latch Enable signal that is provided to the enable inputs of the latches 20. As shown, pullup and/or pulldown resistors 22 are connected to the Latch Enable line, to provide functionality described below.

The device of FIG. 2 operates as follows during an upgrade. During normal operation prior to the upgrade, the Latch Enable signal is in a state that maintains the latches 20 "open", so that the control signals from the control logic 12' and/or the microprocessor 14 flow through the latches 20 to control the operation of the elements 10. It is assumed that the control logic 12' is to be re-programmed during the upgrade, and that the control outputs of the control logic 12' become undefined during the upgrade. Immediately prior to the re-programming, the control logic 12' toggles the Latch Enable signal to close the latches 20. This action has no effect on the elements 10, because the values of the protected control signals have simply maintained their previous values, due to the action of the latches 20. The pullup/pulldown resistors 22 are configured to maintain the Latch Enable signal in this "latching" state whenever the control logic 12' does not drive it to the opposite state.

The microprocessor 14 then re-programs the control logic 12'. During this process, the outputs of the control logic 12' (including the output driving the Latch Enable signal) attain a high-impedance state, as discussed above. This condition does not affect the operation of the elements 10, however, because the protected control signals are maintained in their pre-upgrade states by the closed latches 20. After re-programming is complete, the control outputs of the control logic 12', other than the Latch Enable output, are returned to the state that they held immediately prior to programming, and then the Latch Enable output is asserted by the control logic 12' to re-open the latches 20. The elements 10 are thereafter controlled by the values of the control outputs from the control logic 12' and/or the microprocessor 14.

It is possible that the re-programming of the control logic 12' and/or microprocessor 14 causes the values of one or more control signals to change from their pre-upgrade values. This occurrence may result in momentary spurious operation of the elements 10, which will generally affect network traffic. In some cases it may be desirable to provide synchronization logic (not shown) between the latches 20 and the elements 10 to ensure that the elements 10 see a correct transition of the control signal, if a service disruption can thereby be avoided.

In general, however, the above-described technique is better suited for use with control signals whose values generally are not changed by an upgrade. In a common case, the control signals may be generated from registers within the control logic 12' that are programmed by the microprocessor 14, and the upgrade affects operations of the control logic 12' apart from the registers. An example of this type of upgrade is presented below. In a case such as this, the microprocessor 14 need only ensure that the registers are re-programmed to their correct values before allowing the control logic 12' to resume control of the Latch Enable signal after an upgrade is complete. If that is done, the elements 10 do not experience any changes in their control inputs from before to after the upgrade, so that network traffic is not affected at all.

Figure 3:
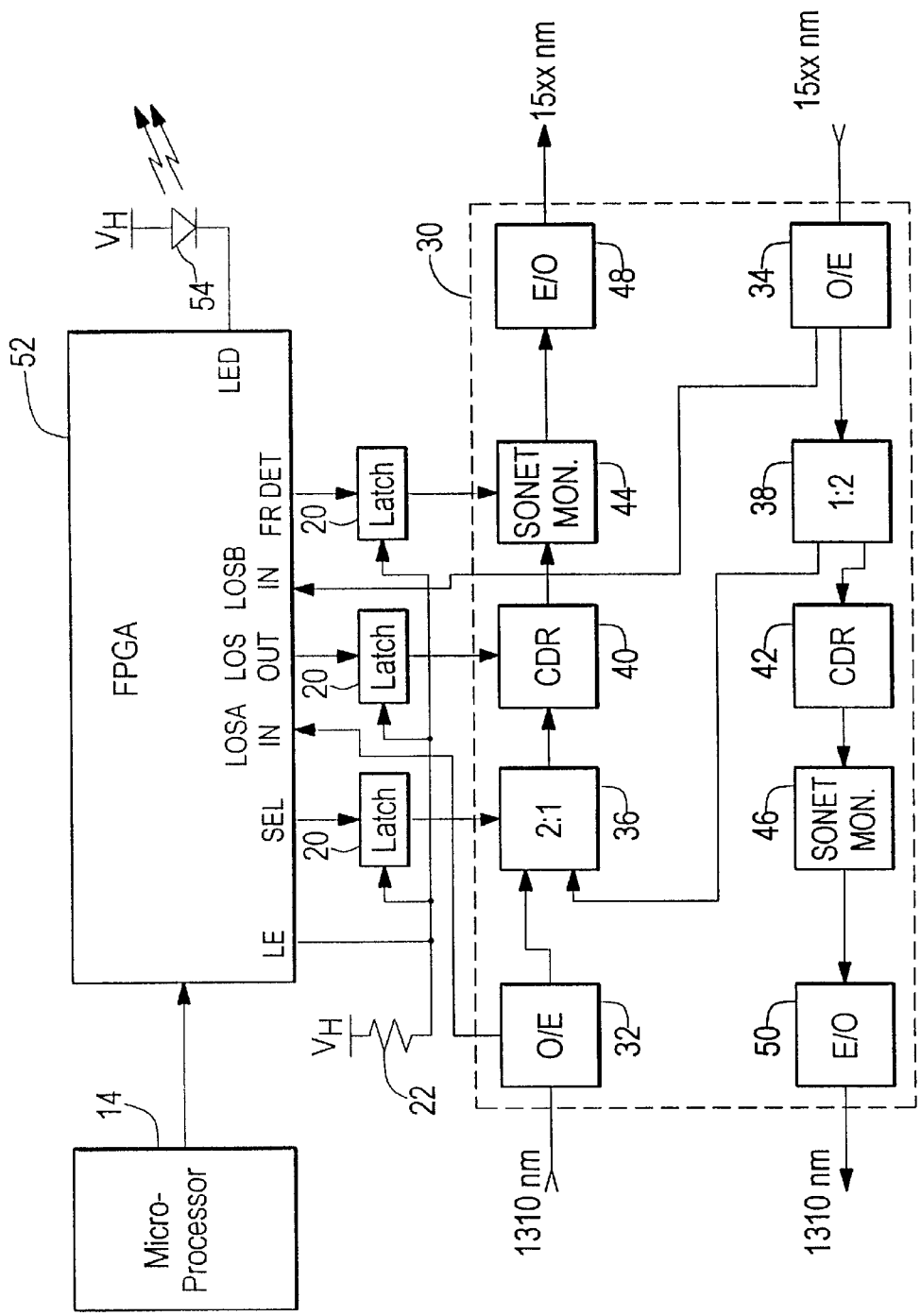
FIG. 3 is a block diagram of a more specific network device of the type shown in FIG. 2.

FIG. 3 illustrates a specific example of the more general scheme depicted in FIG. 2. A set of network elements 30 operates to convert a first optical signal having a wavelength in the region of 1310 nanometers (nm) to an electrical form, re-format the signal, and then convert the signal into an optical signal in the 1500 nm region. Additional elements perform the reverse functions to translate a received 15xx nm signal to a 1310 nm signal. This circuitry can be used to transfer Gigabit Ethernet or Fiber Channel signals (carried at the 1310 nm wavelength) over a wave in the 15xx nm region in a wavelength-division multiplexed (WDM) communications system, using synchronous optical network (SONET) signal formatting.

In particular, the device of FIG. 3 includes the following elements: optical-to-electrical (O/E) converters 32 and 34; a 2:1 multiplexer 36 and 1:2 de-multiplexer 38 used to selectively enable either the incoming 1310 nm signal or the incoming 15xx nm signal to be transmitted as the outgoing 15xx nm signal; clock/data recovery (CDR) circuits 40 and 42; SONET monitoring circuitry 44 and 46; and electrical-to-optical (E/O) converters 48 and 50. It will be appreciated that the O/E converters 32 and 34 are typically light-sensitive diodes, and the E/O converters 48 and 50 are typically lasers.

As shown, an FPGA 52 provides various control signals to selected elements in the set 30, and also receives input signals therefrom carrying information used by functions within the FPGA. For purposes of illustration, control signals SEL, LOS OUT, and FR_DET are shown, along with input signals LOS A IN and LOS B IN. SEL controls the setting of the 2:1 multiplexer 36. LOS A IN and LOS B IN carry Loss of Signal indications generated by the respective O/E converter 32 or 34 whenever a loss of condition occurs (i.e., no light is present at the detector). LOS A IN and LOS B IN are multiplexed within the FPGA 52 to generate the signal LOS OUT, which is provided to the CDR 40. The multiplexing follows the multiplexing done by the 2:1 multiplexer 36, i.e., the CDR 40 receives the LOS signal from the same O/E converter from which it receives the data signal. The signal FR_DET indicates to the SONET monitoring element 44 what length of framing byte pattern is required to insure proper framing of the traffic exists.

The FPGA 52 also generates a signal LED that drives a light-emitting diode 54. The FPGA 52 can be programmed to assert the LED signal in response to different conditions, to provide a desired indication to a user. An example is given below.

The signals SEL, LOS OUT and FR_DET are supplied to latches 20, whose respective outputs are provided to the corresponding control inputs of the elements 36, 40 and 44. The latches 20 receive a latch enable signal LE from the FPGA 52 on a signal line connected to a pull-up resistor 22. A microprocessor 14 is coupled to the FPGA 52. The microprocessor 14 controls the states of the SEL, LOS OUT and FR_DET signals by setting corresponding registers (not shown) within the FPGA 52. The microprocessor 14 is also capable of re-programming the FPGA 52 as part of an upgrade.

It is assumed that prior to an upgrade, the FPGA 52 is programmed to assert the LED signal in response to some set of conditions, and that one purpose of the upgrade is to change the function of the LED to indicate Loss of Signal. Thus, the FPGA 52 when re-programmed will assert the signal LED whenever the selected one of LOS A IN or LOS B IN is asserted. This is an example of a type of upgrade that does not affect the values of the control signals SEL, LOS OUT, and FR_DET. When the upgrade is performed in the manner described above, the control inputs to the elements 36 and 44 are maintained stable as the FPGA 52 is being re-programmed. Assuming that the microprocessor 14 re-establishes the correct values for these control signals by re-programming the corresponding registers at the end of the upgrade, then the signals remain stable when the latches 20 are re-opened at the end of the upgrade. As a consequence, the LOS monitoring function in the FPGA 52 has been modified without any disruption to network traffic.

Figure 4:
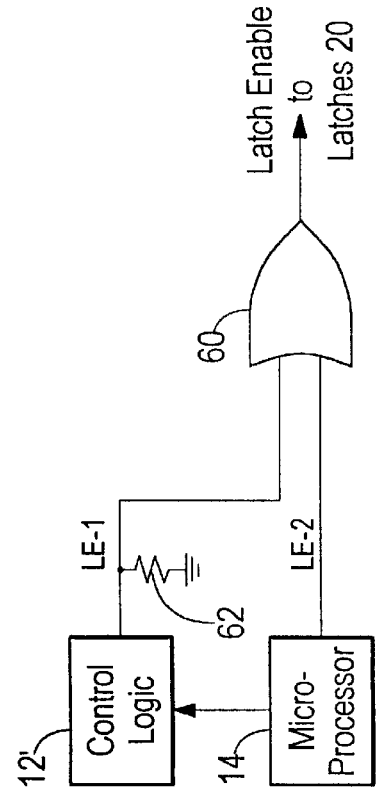
FIG. 4 is a schematic diagram of an alternative way of creating a latch enable signal in the device of FIG. 3.

FIG. 4 shows an alternative way of controlling the Latch Enable signal. The microprocessor 14 and the control logic 12' supply respective control signals LE-1 and LE-2 to an OR gate 60, whose output is provided to the latches 20. Additionally, the signal LE-1 is provided with a pull-down resistor 62. During normal operation, both LE-1 and LE-2 are de-asserted, so that the latches 20 are open. It is assumed that at all times during an upgrade, either the control logic 12' or the microprocessor 14 is validly asserting its LE output. For example, if the control logic 12' is being upgraded according to the above example, then the microprocessor 14 asserts the signal LE-2 throughout the upgrade. If this is done, it is safe for the non-controlling component (e.g. the control logic 12' in the above example) to temporarily have an undefined LE output without affecting the value of the Latch Enable signal, so that the latches 20 remain closed.

Methods and apparatus for de-coupling the operation of functional elements from the control of the functional elements have been described. It will be apparent to those skilled in the art that other modifications to and variations of the above-described technique are possible without departing from the inventive concepts disclosed herein. Accordingly, the invention should be viewed as limited solely by the scope and spirit of the appended claims.

What is claimed is:

1. A method of upgrading programmable control logic having control outputs coupled to corresponding control inputs of functional elements to control the operation thereof, the method comprising:

latching the control inputs of the functional elements so as to prevent the control outputs of the control logic from affecting the operation of the functional elements during an upgrade;

after latching the control inputs of the functional elements, re-programming the control logic such that the manner of operation of the control logic is changed; and after re-programming the control logic, un-latching the control inputs of the functional elements so as to allow the control outputs of the control logic to thereafter affect the operation of the functional elements.

2. A method according to claim 1, wherein the control outputs of the control logic take on indeterminate values during re-programming.

3. A method according to claim 2, wherein the control outputs of the control logic enter a high-impedance state during reprogramming.

4. A method according to claim 3, wherein the control logic resides in a field-programmable gate array.

5. A method according to claim 4, wherein the field-programmable gate array generates a latch enable signal to control the latching of the control inputs of the functional elements, the latch enable signal also entering a high-impedance state during re-programming of the control logic, and wherein the field-programmable gate array is operative to latch the control inputs of the functional elements immediately prior to the re-programming of the control logic.

6. A method according to claim 5, wherein the latch enable signal is maintained at a latching value by a pullup/pulldown circuit during the re-programming of the control logic.

7. A method according to claim 1, wherein the control logic has inputs coupled to corresponding outputs of the functional elements, and wherein the control logic operates at least in part in response to the values of the inputs.

8. A method according to claim 7, wherein the manner of operation of the control logic in response to the values of the inputs is changed by the re-programming.

9. A method according to claim 8, wherein the control outputs of the control logic after the re-programming are the same as before the reprogramming.

10. A method according to claim 1, wherein the control logic generates a latch enable signal to control the latching of the control inputs of the functional elements, the latch enable signal entering a high-impedance state during re-programming of the control logic, and wherein the control logic is operative to latch the control inputs of the functional elements immediately prior to the re-programming of the control logic.

11. A method according to claim 10, wherein the latch enable signal is maintained at a latching value by a pullup/pulldown circuit during the re-programming of the control logic.

12. A method according to claim 10, wherein the control outputs of the control logic take on indeterminate values during re-programming, and further comprising overriding the latch enable signal to maintain the latch enable signal at a latching value during the re-programming of the control logic.

13. A method according to claim 12, wherein the overriding comprises passively pulling the latch enable signal to the latching value.

14. A method according to claim 12, wherein the overriding comprises generating an override signal, logically OR'ing the override signal with the latch enable signal, and controlling the latching of the control inputs of the functional elements based on the logical OR'ing.

15. Apparatus for controlling functional elements of a network device, comprising:

programmable control logic having control outputs carrying control signals to be coupled to corresponding control inputs of the functional elements to control the operation thereof;

programming logic operative to re-program the control logic during an upgrade thereof; and latches disposed between the control logic and the functional elements, the latches being operative to pass the control signals from the control logic to the control inputs of the functional elements during normal operation and to latch the control inputs of the functional elements during the re-programming of the control logic to prevent the control outputs of the control logic from affecting the operation of the functional elements during the upgrade.

16. Apparatus according to claim 15, wherein the control outputs of the control logic take on indeterminate values during re-programming.

17. Apparatus according to claim 16, wherein the control outputs of the control logic enter a high-impedance state during re-programming.

18. Apparatus according to claim 17, wherein the control logic resides in a field-programmable gate array.

19. Apparatus according to claim 18, wherein the field-programmable gate array generates a latch enable signal to control the operation of the latches, the latch enable signal also entering a high-impedance state during re-programming of the control logic, and wherein the field-programmable gate array is operative to place the latch enable signal in a latching state immediately prior to the re-programming of the control logic.

20. Apparatus according to claim 19, further comprising a pullup/pulldown circuit operative to maintain the latch enable signal at the latching value during the re-programming of the control logic.

21. Apparatus according to claim 15, wherein the control logic has inputs coupled to corresponding outputs of the functional elements, and wherein the control logic operates at least in part in response to the values of the inputs.

22. Apparatus according to claim 21, wherein the re-programming of the control logic is operative to change the manner in which the control logic operates in response to the values of the inputs.

23. Apparatus according to claim 22, wherein the re-programming logic and control logic are cooperatively operative such that the values of the control signals after the upgrade are the same as before the upgrade.

24. Apparatus according to claim 15, wherein the control logic generates a latch enable signal to control the operation of the latches, the latch enable signal entering a high-impedance state during the re-programming of the control logic, and wherein the control logic is operative to place the latch enable signal in a latching state immediately prior to the re-programming of the control logic.

25. Apparatus according to claim 24, further comprising a pullup/pulldown circuit operative to maintain the latch enable signal at the latching value during the re-programming of the control logic.

26. Apparatus according to claim 24, wherein the control outputs it of the control logic take on indeterminate values during re-programming, and further comprising an override circuit operative to override the latch enable signal to maintain the latch enable signal at a latching value during the re-programming of the control logic.

27. Apparatus according to claim 26, wherein the override circuit comprises a pullup/pulldown circuit.

28. Apparatus according to claim 26, wherein the override circuit comprises a microprocessor operative to generate an override signal and an OR gate coupled to receive the override signal and the latch enable signal, the output of the OR gate being coupled to the latches to control the operation thereof.

* * * * *

UNITED STATES PATENT AND TRADEMARK OFFICE
CERTIFICATE OF CORRECTION

PATENT NO. : 6,557,101 B1
DATED : April 29, 2003
INVENTOR(S) : Eric MacDonald et al.

Page 1 of 1

It is certified that error appears in the above-identified patent and that said Letters Patent is hereby corrected as shown below:

Column 8,
Line 23, "outputs it of" should read -- outputs of --.

Signed and Sealed this

Twentieth Day of July, 2004

JON W. DUDAS
*Acting Director of the United States Patent and Trademark Office*